(12) United States Patent
Mann et al.

(10) Patent No.: US 9,377,982 B1
(45) Date of Patent: Jun. 28, 2016

(54) SHORT TERM JOB CANCELING IN ESU MODEL PRINTER

(71) Applicant: KYOCERA Document Solutions Inc., Osaka (JP)

(72) Inventors: Timmy Mann, Concord, CA (US); Gail Giansiracusa, Concord, CA (US); Seiichi Katano, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/640,857

(22) Filed: Mar. 6, 2015

(51) Int. Cl.
*G06K 15/00* (2006.01)
*G06F 3/12* (2006.01)

(52) U.S. Cl.
CPC ............ *G06F 3/1274* (2013.01); *G06F 3/1203* (2013.01); *G06F 3/1236* (2013.01); *G06K 15/4055* (2013.01)

(58) Field of Classification Search
USPC ............... 358/1.18, 1.15, 1.14, 400, 401, 1.9, 358/1.13
See application file for complete search history.

(56) References Cited

U.S. PATENT DOCUMENTS

| | | | | |
|---|---|---|---|---|
| 2003/0156129 A1* | 8/2003 | Takahashi | ............. | G06F 1/3215 715/700 |
| 2006/0044580 A1* | 3/2006 | Maeda | ............... | H04N 1/00352 358/1.9 |
| 2007/0260337 A1* | 11/2007 | Sugiyama | ................ | G06F 1/32 700/40 |
| 2011/0182208 A1* | 7/2011 | Shima | ..................... | G06F 1/266 370/254 |
| 2014/0186059 A1* | 7/2014 | Suzuki | ............... | G03G 15/5004 399/16 |
| 2015/0089257 A1* | 3/2015 | Iizuka | ....................... | G06F 1/32 713/320 |
| 2015/0116750 A1* | 4/2015 | Yoshida | ............. | G03G 15/5004 358/1.13 |
| 2015/0192889 A1* | 7/2015 | Osawa | ............... | G03G 15/5075 399/88 |

FOREIGN PATENT DOCUMENTS

| | | |
|---|---|---|
| JP | 2002-086863 A | 3/2002 |
| JP | 2003-303060 A | 10/2003 |

* cited by examiner

*Primary Examiner* — Jerome Grant, II
(74) *Attorney, Agent, or Firm* — McDonnell Boehnen Hulbert & Berghoff LLP (57) ABSTRACT

Systems and methods for performing print job cancellation in an ESU model printer are provided. An embodiment can involve receiving, at an ESU of a printing device, a print job, wherein the print job includes a first portion. The first portion can be transmitted from the ESU to a main unit. The main unit can receive a print job cancel command corresponding to the received print job, wherein the cancel command is received after the first portion is transmitted to the main unit, but before the full print job has been transmitted. The main unit can then transmit a notification of the received cancel command to the ESU. The ESU can receive the notification of the received cancel command, and responsive to receiving the notification, terminate the transmission of the print job from the ESU to the main unit.

20 Claims, 6 Drawing Sheets

SHORT TERM JOB CANCELING IN ESU MODEL PRINTER

BACKGROUND

1. Field of the Invention

Unless otherwise indicated herein, the description in this background section is not prior art to the claims in this application and is not admitted to be prior art by inclusion in this section. The present disclosure relates to methods and systems for canceling a print job in an energy saving unit (ESU) model printing device.

2. Description of the Related Art

Modern printing devices are becoming increasingly complex as a result of added functions, applications, and services. Some printing devices include an ESU and a main unit, which in combination may allow a given printing device to enter an energy saving mode. Printing devices that incorporate an ESU and a main unit may be configured to have a network printing module residing on the ESU, and have an image forming module residing on the main unit. In this configuration, incoming print jobs may be required to pass from the ESU to the main unit before being printed. As such, one or more bottlenecks may arise, one in particular being the connection between the ESU and main unit. As a result, one particular problem that arises is that a user who wishes to cancel a print job that is currently in progress may be required to wait up to several minutes for the cancellation to complete.

In addition, where a printing device receives a command to cancel a print job currently being transmitted to the printing device, communication between the ESU and the main unit may continue even after the job has been canceled.

Further, where a print job is canceled by terminating a connection between the printing device and a network connected device, the network connected device may attempt to retransmit the print job upon reestablishing a connection with the printing device. Thus, delays and errors may be introduced. As a result, a need exists for a more efficient method and system for cancelling a print job in an ESU model printer.

SUMMARY

In a first aspect, a method is provided. The method preferably includes receiving, at an ESU of a printing device, a print job, wherein the print job includes a first portion. The method further includes transmitting the first portion of the print job from the ESU to a main unit of the printing device. The method further includes receiving, at the main unit, a print job cancel command corresponding to the received print job, wherein the cancel command is received after the first portion is transmitted to the main unit, but before the full print job has been transmitted. The method then includes transmitting a notification of the received cancel command from the main unit to the ESU. The method yet further includes receiving, at the ESU, the notification of the received cancel command. Finally, the method includes, responsive to receiving the notification, terminating the transmission of the print job from the ESU to the main unit.

In a second aspect, a system is provided. The system preferably includes an ESU of a printing device and a main unit of the printing device. The ESU is preferably configured to receive a print job, wherein the print job includes a first portion. The ESU is further configured to transmit the first portion of the print job to the main unit of the printing device. The ESU is further configured to receive a notification of a print job cancel command, wherein the cancel command corresponds to the received print job. The ESU is yet further configured to terminate the transmission of the print job from the ESU to the main unit. The main unit of the printing device is preferably configured to receive the print job cancel command corresponding to the received print job, wherein the cancel command is received after the first portion is transmitted to the main unit, but before the full print job has been transmitted. The main unit is further configured to transmit the notification of the received cancel command to the energy saving unit.

In a third aspect, a non-transitory computer readable medium is provided. The non-transitory computer readable medium has stored thereon program instructions that, upon execution by a processor cause performance of a set of acts including receiving, at an energy saving unit, a print job, wherein the print job includes a first portion. The set of acts further includes transmitting the first portion of the print job to a main unit. The set of acts also includes receiving a print job cancel command corresponding to the received print job, wherein the command is received before the full print job has been received. The set of acts yet further includes, responsive to receiving the notification, terminating the transmission of the print job from the energy saving unit to the main unit.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims, are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

The present disclosure may relate to methods and systems for canceling a print job in an ESU model printer. Specifically, an example method may include a client device transmitting a print job to a printing device. The printing device may receive the print job at an ESU of the printing device. The print job may comprise data representing text, pictures, or other information, and may be in any of several different formats, including enhanced metafile (EMF), RAW format, or text format, for example. In addition, the print job may be any size, ranging from small (e.g., a single page) to large (e.g., hundreds or thousands of pages). Other formats and sizes are possible as well.

Some printing devices may include both an ESU and a main unit, wherein the ESU is configured to receive the print job from a client device or other source, and the main unit includes or is connected to the mechanism configured to print the print job. The example method may include transmitting a first portion of the print job from the ESU to the main unit. In some cases, the ESU may begin transmitting the received portion of the print job to the main unit before the entire print job is received by the ESU, so that the main unit can begin processing the print job (i.e., to increase efficiency by processing the received print job before it is fully received).

In the example method, a user located near the printing device may wish to cancel the print job before the entire print job is received by the ESU. In that case, the method may include receiving, at the main unit, a print job cancel command. In some examples the command may be received via a user interface connected to the printing device.

In some cases, it may be possible to cancel a print job by terminating transmission of the print job from the client device to the ESU. However, current systems may not be able to transmit a cancel command received by the main unit from the main unit to the ESU, or from the ESU to a client device. Further, some client devices may continue to send or retransmit the print job even after a cancel command is sent, which may cause errors or delays in canceling the print job.

To solve these problems, the disclosed method may include transmitting a notification of the received cancel command from the main unit to the ESU. The method may also include, responsive to receiving the notification, terminating the transmission of the print job from the ESU to the main unit.

II. System Examples

Figure 1:
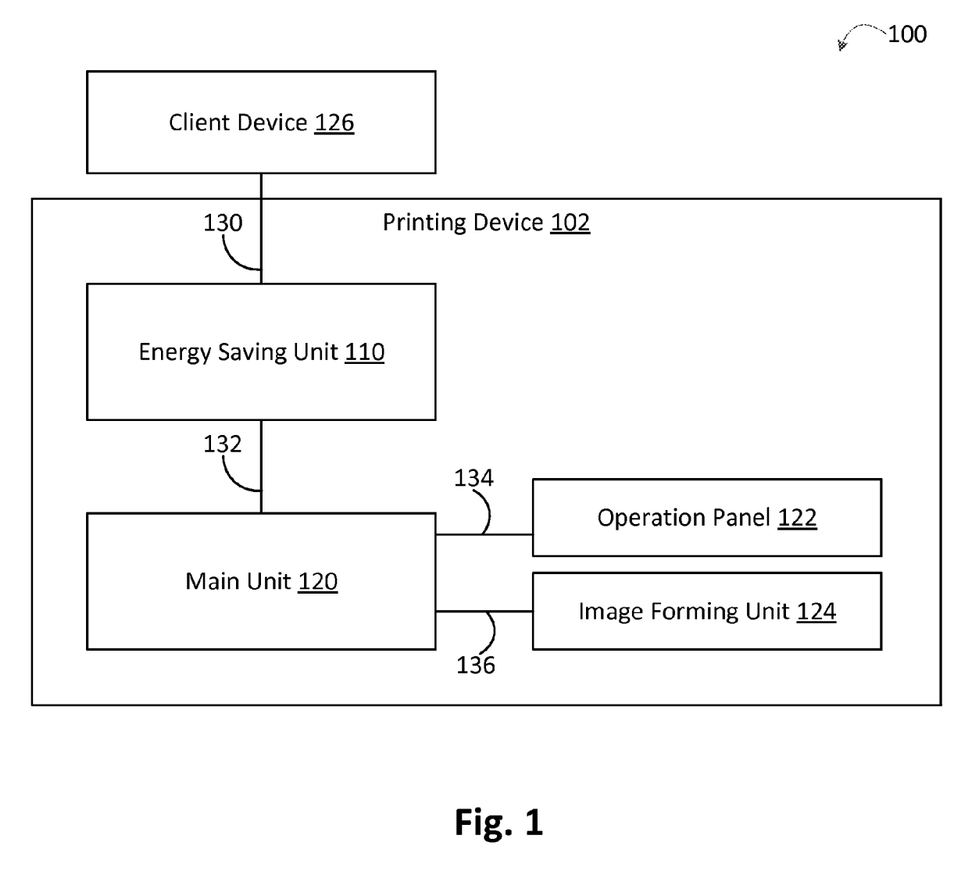
FIG. 1 is a block diagram illustrating an example system according to an embodiment of the present disclosure.

FIG. 1 is a block diagram illustrating an example system 100 according to an embodiment of the present disclosure. System 100 may include a printing device 102 and a client device 126. Printing device 102 may include an ESU 110, a main unit 120, an operation panel 122, and an image forming unit 124. The components of system 100 may be connected with each other and/or with one or more other components, devices, or systems via one or more communication paths. For example, a communication path 130 may connect the client device 126 to the ESU 110, a communication path 132 may connect the ESU 110 to the main unit 120, a communication path 134 may connect the main unit 120 to the operation panel 122, and a communication path 136 may connect the main unit 120 to the image forming unit 124. Each communication path may traverse a communication network.

Client device 126 in the system 100 may be configured to transmit a print job to ESU 110. In some examples client device 126 may be implemented as a computing device, such as computing device 400 discussed in more detail with respect to FIG. 4. In other examples, client device 126 may be a server, personal computer, mobile or handheld device, or other device configured to connect to printing device 102 via a network. Client device 126 may be connected to ESU 110 in printing device 102 via communication path 130. Communication path 130 may include a wired or wireless connection, such as an Ethernet connection, Universal Serial Bus (USB) connection, twisted pair wire, coaxial cable, fiber-optic link, Bluetooth connection, Wi-Fi, WiMAX, or wireless wide-area network (WWAN) connections for example.

Operation Panel 122 in the system 100 may be configured to receive, as input, a command to cancel a print job. In some examples, operation panel 122 may include a user interface, such as a touch screen, keyboard, keypad, computer mouse, trackpad, joystick, camera, voice recognition module, and/or other similar devices. In a particular example, the user interface may include a hard key or soft key button, which may function as a "Job Cancel Button."

Image forming unit 124 in system 100 may include components configured to cause an image to be rendered. In some examples, the image forming unit may include a print head, one or more ink cartridges, and a paper feed assembly (i.e. components of an inkjet printer). Alternatively, image forming unit 124 may include a laser printer assembly, having a laser scanning unit, photoreceptor drum, toner hopper, fuser, and developer roller (i.e., components of a laser printer). Image forming unit 124 may include other types of image rendering devices and systems as well.

a. Energy Saving Unit

Figure 2:
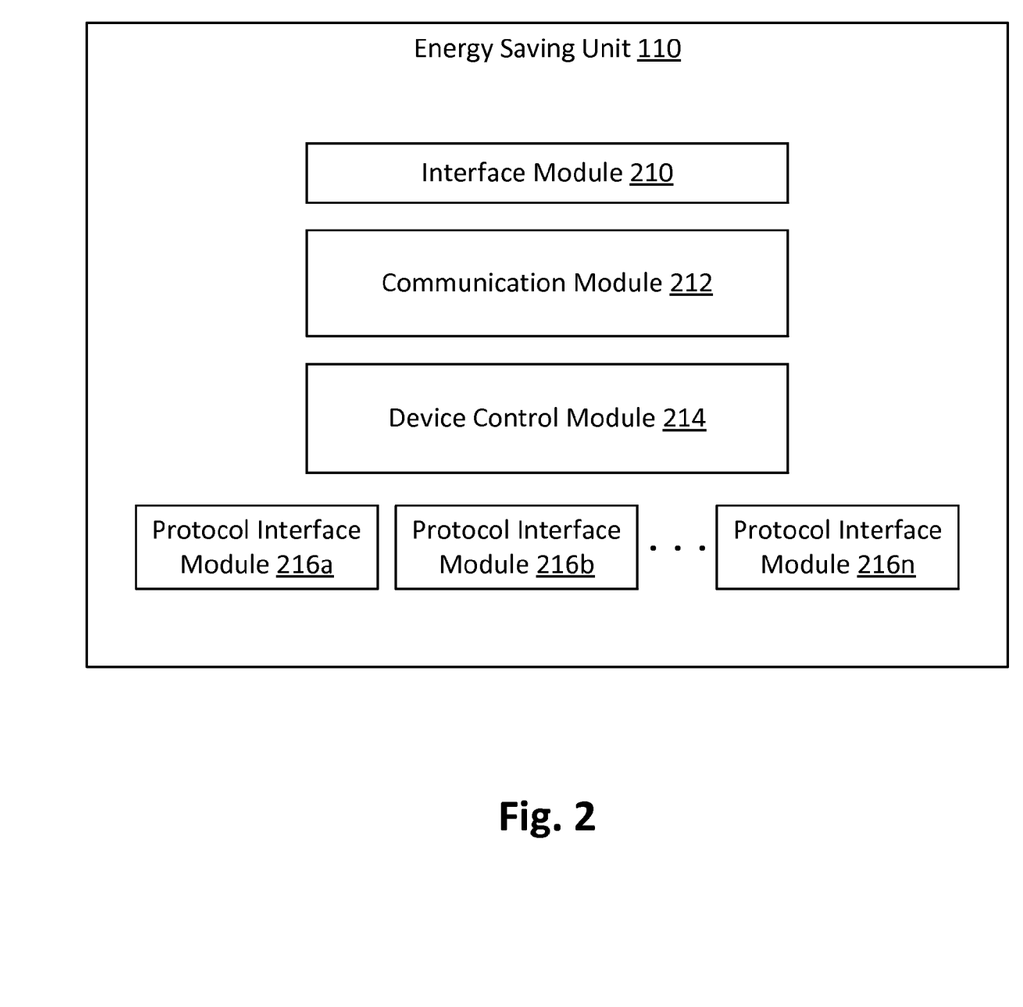
FIG. 2 is a block diagram illustrating an example ESU according to an embodiment of the present disclosure.

FIG. 2 is a block diagram illustrating an example ESU 110 according to an embodiment of the present disclosure. ESU 110 may include an interface module 210, a communication module 212, a device control module 214, and one or more protocol interface modules (PIMs) 216a-n. ESU 110 may be implemented as a stand-alone component, or integrated with one or more other components, such as those described in disclosure. For example, ESU 110 may be implemented as all or part of a computing device similar or identical to computing device 400 described in more detail below with respect to FIG. 4. As another example, ESU 110 may share a processor, communication interface, and/or data storage with one or more other components. ESU 110 may be configured to perform one or more acts, such as receiving a print job, and receiving and transmitting various signals and/or data, for example.

Interface module 210 in ESU 110 may be configured to communicate with main unit 120. For example, interface module 210 may communicate by transmitting and/or receiving various signals and data. Communication between interface module 210 and main unit 120 may occur via communication path 132. Communication path 132 may include a Peripheral Component Interconnect Express (PCIe) bus. Other types and methods of connection are possible as well.

Communication module 212 in ESU 110 may be configured to establish a connection between interface module 210 and main unit 120. In one example, communication module 212 may establish a connection by controlling one or more communication ports.

Communication module 212 may also be configured to prepare print job data to be transmitted from the ESU 110 to the main unit 120. For example, communication module 212 may compress, encrypt, organize and/or reorganize print job data in preparation for transmission from ESU 110 to main unit 120. Preparation of the print job data may facilitate a quicker, more efficient, and/or more robust transfer of data.

Device control module 214 in ESU 210 may be configured to serialize and/or spool the received print job. Serializing and/or spooling may involve, when a print job is transmitted to ESU 210 (e.g., from a client device), placing the print job into a queue for additional or later processing.

Device control module 214 may also be configured to discard or maintain data, for example, when a print job cancel command is received. Discarding data may include deleting the data, removing the data from a storage structure, or removing the data from a queue, for example. Other methods are possible as well. In some examples, the discarded print data may correspond to the print job cancel command. Device module 214 may determine which data to discard or maintain based on the received print job cancel command. For example, when a print job cancel command is received, it may be given a time stamp. The time stamp may be compared against time stamps given to incoming print jobs, such that only the print job most closely related in time to the cancel command is selected by device module 214. As another example, a received print job cancel command may include an identifier, which may be compared to incoming print jobs. As a result, device module 214 may determine that an action should be taken on only the print job identified by the print job cancel command.

In some examples, device control module 214 may be configured to discard or maintain data based on input from one or more PIMs 216a-n. For instance, one or more PIMs may determine, based on the protocol by which the print job was transmitted to the ESU, that print data should be maintained. In yet another example, one or more PIMs may determine that given print job data should be maintained until the entire print job is received by the ESU, and only then discarded. These concepts are discussed further in connection with the PIMs 216a-n.

In one embodiment, ESU 110 may create a process that runs in parallel to the device control module 214 discarding the received print job. Device control module 214 may be unable to process incoming print jobs at the same time as it is discarding another print job. As such, before or during the time when device control module 214 is discarding the received print job, ESU 110 may create a new process that discards the print job. The creation of the new process allows device control module 214 to process incoming print jobs at the same time as the old print job is being discarded, which may increase system efficiency.

Protocol Interface Modules (PIMs) 216a-n in ESU 110 may be configured to receive print jobs, including print job data, from one or more sources. In some examples, a print job may be received from a client device 126. In other examples, a print job may be received from a device or system connected to the ESU via one or more network connections, for example, via an Ethernet, USB, or Wi-Fi connection. Other example connections may include a fiber-optic link, coaxial cable, Bluetooth, ZigBee, WiMAX, wireless wide-area network (WWAN), and/or other similar type of connection.

In some examples, each PIM may correspond to a protocol by which a print job may be transmitted and received. For example, PIM 216a may correspond to RAW printing protocol. PIM 216b may correspond to line printer remote (LPR) protocol. Other protocols may include internet printing protocol (IPP), file transfer protocol (FTP), and server message block (SMB) protocol, for example. Each PIM 216a-n may include specifications and features specific to the corresponding protocol.

The one or more PIMs 216a-n may be configured to terminate a connection between ESU 110 and client device 126, based on the protocol by which a given print job was transmitted to ESU 110. For example, where a print job is transmitted by a client device via FTP, the corresponding PIM may terminate the connection between the ESU and the client device by severing the connection at the ESU.

In another example, where a print job is transmitted via IPP, the corresponding PIM may initiate termination of the connection between the ESU and the client device by transmitting a command to the client device. Transmitting via IPP may allow a command to be transmitted to the client device. The client device may then sever the connection.

PIMs 216a-n may further be configured to determine whether print job data should be maintained until the full print job is received. In some examples, one or more PIMs may determine that print job data should not be discarded immediately after receiving a cancel command from the main unit. In one example, where a connection between the ESU and a client device is terminated while a print job is mid-transfer, the client device may automatically attempt to resend the cancelled print job upon reestablishing a connection. This may result in unwanted communication and tying up of computing resources. Therefore, in this example a PIM may determine that the PIM should continue receiving the print job until the full print job is received, thus preventing the client device from attempting to resend the cancelled print job. The PIM may determine that a connection to the client device should remain open until the full job is received. The device control module 214 may then be configured to discard the full received print job.

b. Main Unit

Figure 3:
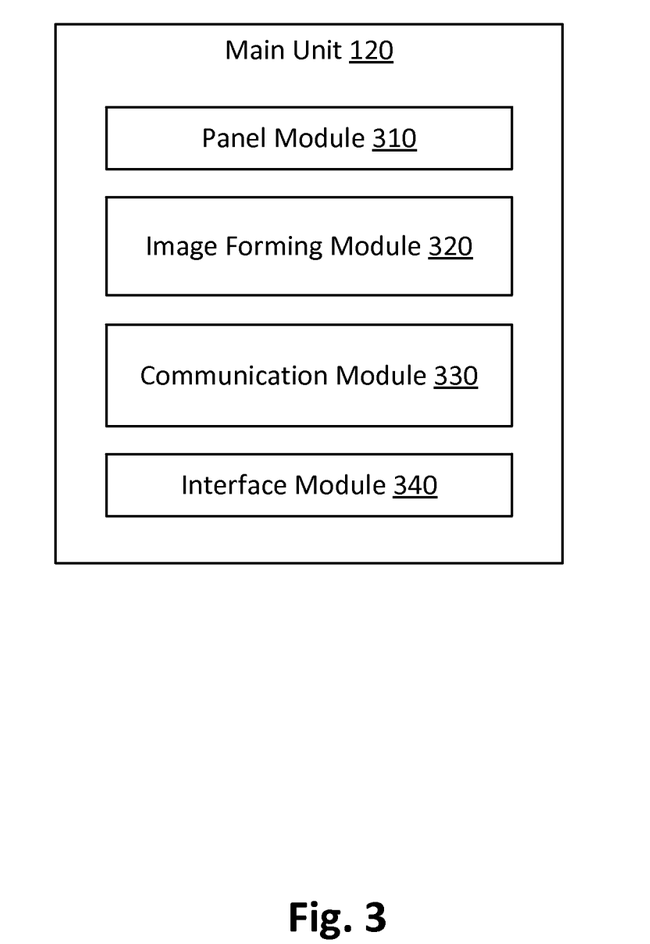
FIG. 3 is a block diagram illustrating an example main unit according to an embodiment of the present disclosure.

FIG. 3 is a block diagram illustrating an example main unit 120 according to an embodiment of the present disclosure. Main unit 120 may include a panel module 310, an image forming module 320, a communication module 330, and an interface module 340. Main unit 120 may be implemented as a stand-alone component of system 100, or integrated with one or more other components, such as those described in this disclosure. For example, main unit 120 may be implemented as all or part of a computing device similar or identical to computing device 400 described in more detail below with respect to FIG. 4. As another example, main unit 120 may share a processor, communication interface, and/or data storage with one or more other components. Main unit 120 may be configured to perform one or more acts, such as receiving a print job from ESU 110, receiving printer commands via operation panel 122, and receiving and transmitting various signals and/or data, for example.

Panel module 310 in main unit 120 may be configured to receive a print job cancel command from operation panel 122. In one example panel module 310 may be connected to operation panel 122 via a communication path, for example via a twisted pair wire, coaxial cable, fiber-optic link, Universal Serial Bus (USB), or other type of physical connection. In another example, panel module 310 may be connected to operation panel 122 via a wireless connection, such as Wi-Fi, Bluetooth, ZigBee, WiMAX, wireless wide-area network (WWAN), and/or other similar type of connections.

The print job cancel command may also include additional data. The additional data may include a time stamp, a print job identifier, file size information, or other meta-data related to the print job.

In some examples, panel module 310 may also be configured to receive other user commands. User commands may be input via operation panel 122, and transmitted to panel module 310 via a communication path. The user commands, when executed by printing device 102, may cause the printing device to perform one or more actions, such as modifying printer settings, modifying network settings, performing system diagnostics, or any action described in this disclosure, for example.

Panel module 310 may also be configured to cause printing device 102 to recover from a sleep mode or low energy mode. In one example, a printing device may be in a sleep mode. A user may input a command via a user interface of the operation panel 122. The command may then be transmitted to the panel module 310, which may then cause the printing device to recover from the sleep mode.

Image forming module 320 in main unit 120 may be configured to process a print job using image forming unit 124. In some examples, image forming module 320 may transmit print job data to image forming unit 124 via a communication path, such as communication path 136, for example.

Communication module 330 in main unit 120 may be configured to establish a connection between interface module 340 and ESU 110. In one example, communication module 330 may establish a connection by controlling one or more communication ports. In other examples, communication module 330 may establish a connection between ESU 110 and main unit 120 via their respective interface modules (i.e., interface module 210 in ESU 110 and interface module 340 in main unit 120). ESU 110 and main unit 120 may then communicate via communication path 132, which may include a PCIe link, for example.

Communication module 330 may also be configured to determine whether communication between ESU 110 and main unit 120 has been terminated. In the case where the connection has been terminated, communication module 330 may determine that a full print job has been transmitted from ESU 110 to main unit 120, and a print job cancel command need not be transmitted to ESU 110.

However, where communication module 330 determines that the connection between ESU 110 and main unit 120 has not been terminated, main unit 120 may transmit a cancel command, or cancel command notification, to ESU 110. ESU 110 may then perform one or more actions described earlier in this disclosure, such as discarding print job data, maintaining print job data, or transmitting a command to a client device, for example.

Interface module 340 in main unit 120 may be configured to communicate with ESU 110. In some examples, interface module 340 in main unit 120 may communicate with ESU 110 by transmitting and receiving various signals and/or data from interface module 210 in ESU 110. Communication between interface module 330 and ESU 110 may occur via communication path 132, which may include a Peripheral Component Interconnect Express (PCIe) bus. Other types and methods of connection are possible as well.

III. Example Computing Device

Figure 4:
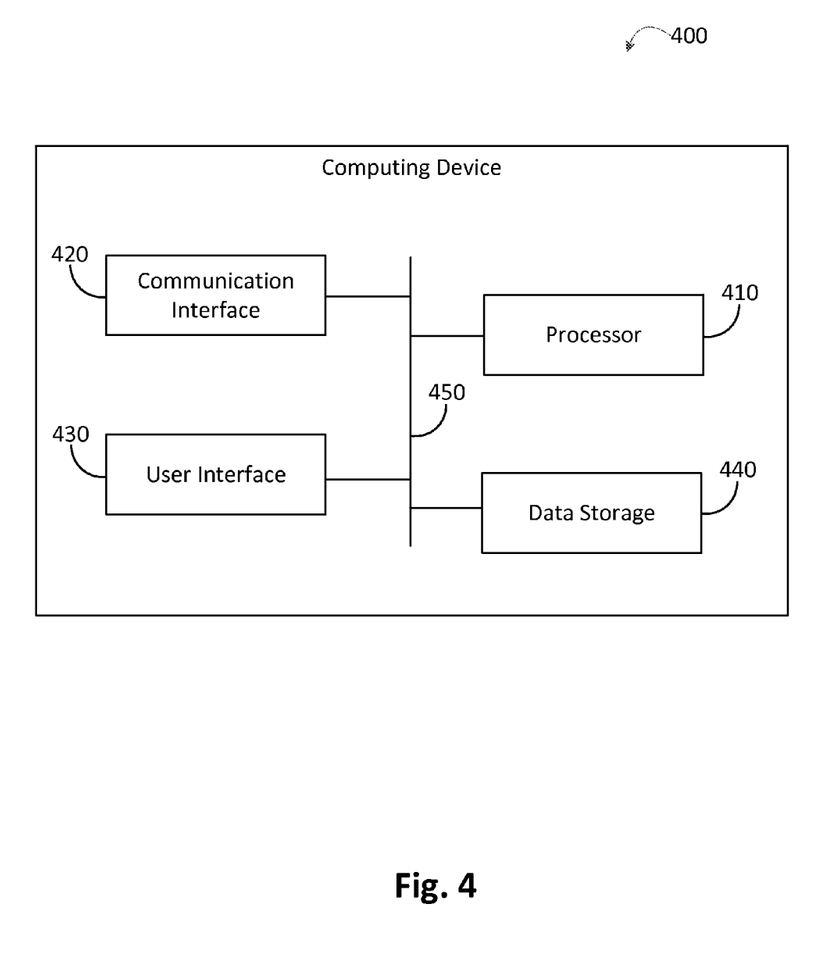
FIG. 4 is a block diagram illustrating an example computing device according to an embodiment of the present disclosure.

FIG. 4 is a block diagram illustrating an example computing device 400 according to an embodiment of the present disclosure. Computing device 400 may be configured for performing a variety of functions or acts, such as those described in this disclosure (including the accompanying drawings). In some examples, computing device 400 may be configured to perform one or more herein-described functions of printing device 102, ESU 110, main unit 120, operation panel 122, image forming unit 124, and client device 126. Computing device 400 may include various components, including for example, one or more processors 410, communication interfaces 420, user interfaces 430, and data storages 440. The components of the computing device 300 may be communicatively connected to each other (or other devices or systems) via a system bus, network, or other link 450.

Processor 410 in computing device 400 may include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processor 410 may be configured to execute computer-readable program instructions contained in data storage 440, and/or other instructions as described herein.

Communication interface 420 in computing device 400 may be configured to allow computing device 400 to communicate with one or more devices (or systems) according to one or more protocols. In one example, communication interface 420 may be a wired interface, such as an Ethernet interface or a USB interface. As another example, communication interface 420 may be a wireless interface, such as a cellular or Wi-Fi interface, for example. Other example communication interfaces may include an Ethernet connection, Universal Serial Bus (USB) connection, fiber-optic link, coaxial cable, Bluetooth, ZigBee, WiMAX, wireless wide-area network (WWAN), and/or other similar type of interface.

User interface 430 in computing device 400 may facilitate interaction with a user of the computing device, if applicable. As such, user interface 430 may include input components such as a keyboard, keypad, computer mouse, trackball, joystick, camera, microphone, voice recognition module, and touch sensitive panel, and output components such as a display screen (which, for example, may be combined with a touch sensitive panel), sound speaker, and haptic feedback system.

Data storage 440 in computing device 400 may include one or more volatile, non-volatile, removable, and/or non-removable storage components, such as magnetic, optical, or flash storage, and may be integrated in whole or in part with processor 410. Further, data storage 440 may take the form of a non-transitory computer-readable storage medium, having stored thereon program instructions (e.g., compiled or non-compiled program logic and/or machine code) that, when executed by processor 410, cause computing device 400 to perform one or more functions or acts, such as those described in this disclosure. Such program instructions may define or be part of a discrete software application that can be executed in response to certain inputs received from user interface 430, for instance. Data storage 440 may also store other types of information or data, such as those types described throughout this disclosure (e.g., print job data or printer commands).

IV. Method Examples

Figure 5:
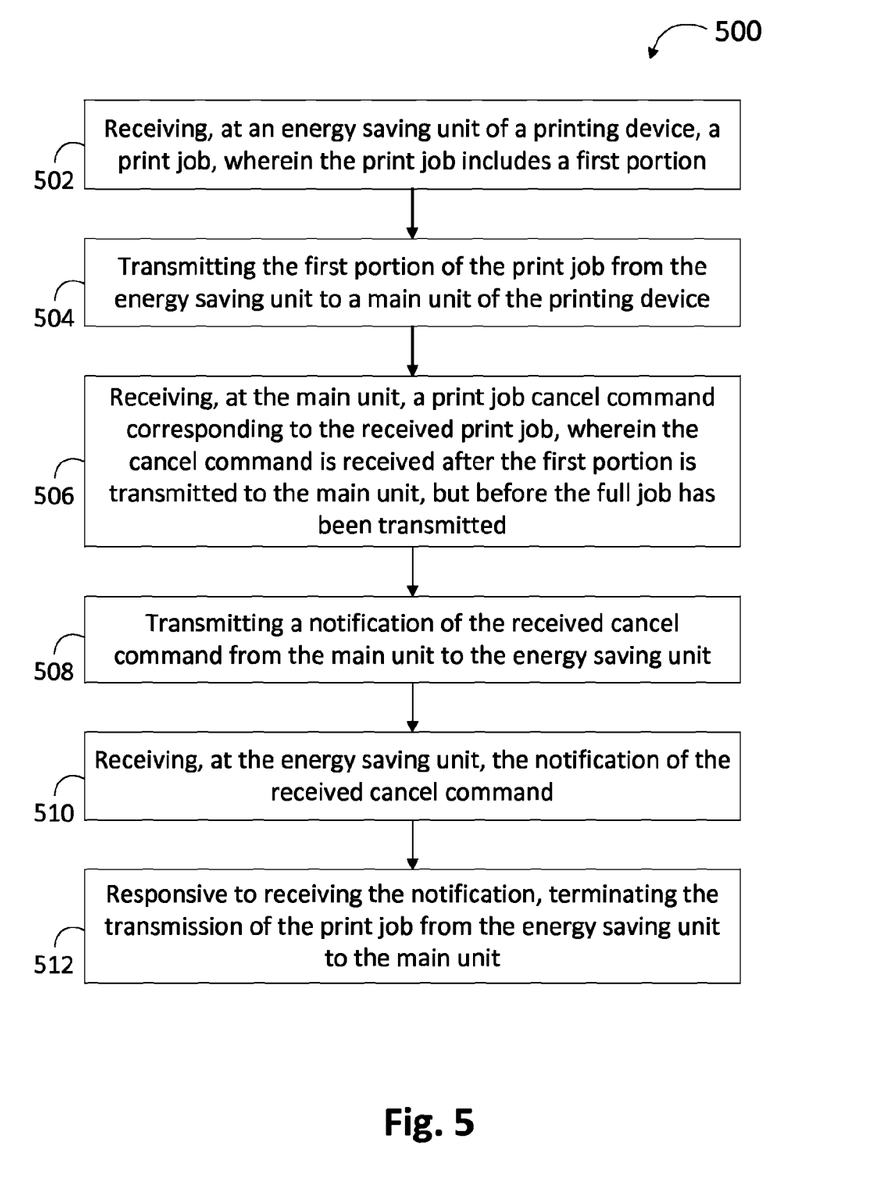
FIG. 5 is a flow chart illustrating an example method according to an embodiment of the present disclosure.
Figure 6:
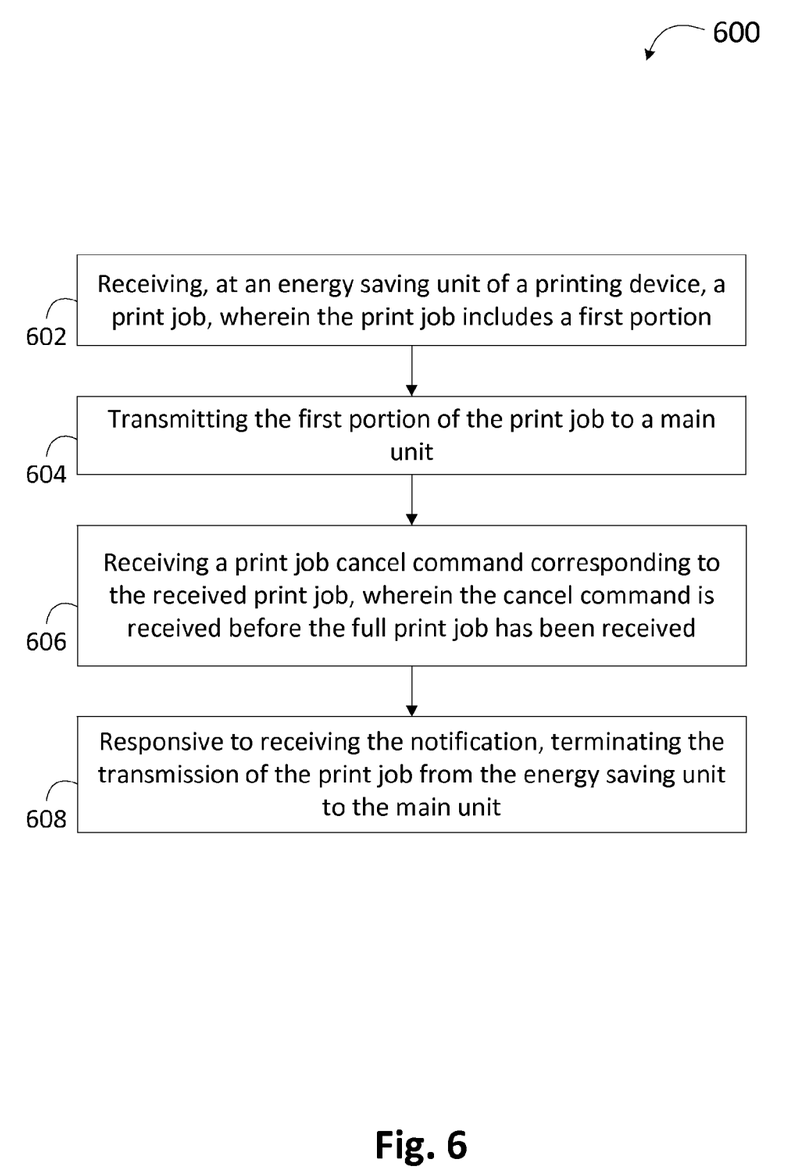
FIG. 6 is a flow chart illustrating an example method according to an embodiment of the present disclosure.

FIGS. 5 and 6 are flow charts illustrating example methods according to various embodiments of the present disclosure. Although FIGS. 5 and 6 illustrate methods 500 and 600 as including certain blocks in a particular order, it should be understood that blocks may be added, subtracted, and/or carried out in a different order while remaining within the scope of this disclosure. Furthermore, some or all of the blocks of methods 500 and 600 may be carried out by system 100 and/or the various components of system 100, including the ESU 110, main unit 120, operation panel 122, image forming unit 124, and client device 126, for example.

Method 500 may include blocks 502-512. At block 502, method 500 may involve receiving, at an ESU of a printing device, a print job, wherein the print job includes a first portion. In one example, the print job may be transmitted according to a particular protocol, and may be received by a protocol interface module 216 in ESU 110. The print job may be transmitted according to RAW, LPR, IPP, FTP, or SMB protocols, for example. The print job may include data representing text, images, or other information a user may wish to print. The first portion of the print job may include a subset of the print job data, which may be denoted by a percentage of the full job (e.g., 1%), a page amount (e.g., 1/50), or an amount of data, for example.

At block 504, method 500 may involve transmitting the first portion of the print job from the ESU to a main unit of the printing device. In some examples, this transmission may take place using a PCIe bus. The transmission may take any appropriate form, such as a packet stream or bit stream, for example. In some examples the first portion of the print job may be transmitted from interface module 210 in ESU 110 to interface module 340 in main unit 120.

At block 506, method 500 may involve receiving, at the main unit, a print job cancel command corresponding to the received print job, wherein the cancel command is received after the first portion is transmitted to the main unit, but before the full job has been transmitted. In some examples the print job cancel command is received by panel module 310 in main unit 120. The command may be transmitted by a user interface connected to main unit 120 via a wired or wireless connection. In other examples the command may be received from a device or system connected to main unit 120 over a network.

The received print job cancel command may include additional information, such as a time stamp, print job identifier, file size information, or other meta-data. In some examples, the ESU may receive multiple print jobs. The additional information included with the print job cancel command may be used to determine which specific print job corresponds to the received print job cancel command.

At block 508, method 500 may involve transmitting a notification of the received cancel command from the main unit to the ESU. In some examples, the transmitted notification may be the received cancel command (i.e., the main unit acts as an intermediary by passing the command from the panel module to the ESU). As another example, the transmitted notification may be a command generated by the main unit. As yet another example, the transmitted notification may be an indication that a cancel command has been received by the main unit. In some examples, the transmitted notification may include additional information, such as a time stamp, print job identifier, file size information, or other meta-data.

In some examples, the notification may be transmitted via a PCIe bus. The transmission may take any appropriate form, such as a packet stream or bit stream, for example. In addition, the notification may be transmitted by interface module 340 in main unit 120.

At block 510, method 500 may involve receiving, at the ESU, the notification of the received cancel command. In some examples, the notification may be received by interface module 210 in ESU 110. Other examples are possible as well.

At block 512, method 500 may involve, responsive to receiving the notification, terminating the transmission of the print job from the ESU to the main unit. In some examples, the communication module 212 in ESU 110 may terminate transmission of the print job by closing a connection between ESU 110 and main unit 120. In other examples, communication module 212 may terminate transmission of the print job by maintaining a connection, but determining not to transmit the print job.

FIG. 6 is a flow chart illustrating an example method 600 according to an embodiment of the present disclosure. One or more blocks of method 600 may be similar or identical to one or more blocks of method 500.

At block 602, method 600 may involve receiving, at an ESU of a printing device, a print job, wherein the print job includes a first portion.

At block 604, method 600 may involve transmitting the first portion of the print job to a main unit.

At block 606, method 600 may involve receiving a print job cancel command corresponding to the received print job, wherein the cancel command is received before the full print job has been received.

At block 608, method 600 may involve, responsive to receiving the notification, terminating the transmission of the print job from the ESU to the main unit.

V. Other Examples

In some examples, methods 500 and/or 600 may further include terminating a connection between the ESU and a client device, depending upon a determination of the printing protocol by which the print job was transmitted. For instance, where the print job was transmitted according to FTP, the ESU may terminate a connection between the ESU and the client device by closing the connection from the ESU side. In another example, where the print job was transmitted according to one of RAW, LPR, and SMB protocols, the ESU may determine that it should not terminate a connection between the ESU and the client device.

In other examples, methods 500 and/or 600 may further include transmitting a cancel command to a client device, depending upon a determination of the printing protocol by which the print job was transmitted. For instance, where the print job was transmitted from a client device to the ESU according to IPP, the ESU may transmit the cancel command to the client device.

In still further examples, methods 500 and/or 600 may include, responsive to receiving the notification, terminating the transmission of the print job from the ESU to the main unit, and further include receiving, at the ESU, the full print job, depending upon a determination of the printing protocol by which the print job was transmitted. In some cases, a client device may attempt to retransmit a print job if a connection to the ESU is interrupted before the full print job has been transmitted. The retransmission may occur automatically upon reconnection with the ESU. As such, where a print job has been canceled and the ESU wishes to terminate a connection to the client device, the ESU may instead continue to receive the print job until it has been fully transmitted by the client device, in order to avoid the client device attempting to retransmit the cancelled print job. As a specific example, where the print job is transmitted according to RAW port protocol, the ESU may terminate a connection between the ESU and main unit, but maintain a connection to a client device and continue to receive the print job. Once the entire print job has been received, the ESU may then terminate the connection with the client device, and discard the full print job.

In yet further examples, ESU 110 may create a new process that runs in parallel to the device control module 214 discarding the received print job. Device control module 214 may be unable to process incoming print jobs at the same time as it discards a cancelled print job. As such, before or during the time when device control module 214 discards a cancelled print job, ESU 110 may create a new process that begins or continues to discard the print job. The creation of the new process may allow device control module 214 to be able to process incoming print jobs at the same time as the old print job is being discarded.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving, at an energy saving unit of a printing device, a print job, wherein the print job includes a first portion;
transmitting the first portion of the print job from the energy saving unit to a main unit of the printing device;
receiving, at the main unit, a print job cancel command corresponding to the received print job, wherein the cancel command is received after the first portion is transmitted to the main unit, but before the full print job has been transmitted;

transmitting a notification of the received cancel command from the main unit to the energy saving unit;

receiving, at the energy saving unit, the notification of the received cancel command; and responsive to receiving the notification, terminating the transmission of the print job from the energy saving unit to the main unit.

2. The method of claim 1, wherein the print job is received and transmitted according to a printing protocol.

3. The method of claim 2, wherein the printing protocol is file transfer protocol (FTP) or internet printing protocol (IPP).

4. The method of claim 2, further comprising:

determining, by the energy saving unit, the printing protocol by which the print job was transmitted; and responsive to the determination, terminating a connection between the energy saving unit and a client device.

5. The method of claim 2, further comprising:

determining, by the energy saving unit, the printing protocol by which the print job was transmitted; and responsive to the determination, transmitting a cancel command to a client device.

6. The method of claim 2, further comprising:

determining, by the energy saving unit, the printing protocol by which the print job was transmitted; and responsive to the determination, after receiving, at the energy saving unit, the notification of the received cancel command, receiving, at the energy saving unit, the full print job.

7. The method of claim 1, further comprising the energy saving unit discarding the received print job.

8. The method of claim 1, further comprising:

creating, in the energy saving unit, a new process, wherein the new process allows the energy saving unit to discard the received print job and receive a new print job concurrently.

9. The method of claim 1, wherein the print job cancel command corresponding to the received print job is received by the main unit via a user interface.

10. A system comprising:

an energy saving unit of a printing device configured to:

receive a print job, wherein the print job includes a first portion;

transmit the first portion of the print job to a main unit of the printing device;

receive a notification of a print job cancel command, wherein the cancel command corresponds to the received print job; and terminate the transmission of the print job from the energy saving unit to the main unit; and the main unit of the printing device including a panel module, an image forming module, a communication module, and an interface module, the main unit configured to:

receive the print job cancel command corresponding to the received print job, wherein the cancel command is received after the first portion is transmitted to the main unit, but before the full print job has been transmitted; and transmit the notification of the received cancel command to the energy saving unit.

11. The system of claim 10, wherein the print job is received and transmitted according to a printing protocol.

12. The system of claim 11, wherein the printing protocol is file transfer protocol (FTP) or internet printing protocol (IPP).

13. The system of claim 11, wherein the energy saving unit is further configured to:

determine the printing protocol by which the print job was transmitted; and responsive to the determination, terminate a connection between the energy saving unit and a client device.

14. The system of claim 11, wherein the energy saving unit is further configured to:

determine the printing protocol by which the print job was transmitted; and responsive to the determination, transmit a cancel command to a client device.

15. The system of claim 11, wherein the energy saving unit is further configured to:

determine the printing protocol by which the print job was transmitted; and responsive to the determination, after receiving the notification of the print job cancel command, receive the full print job.

16. The system of claim 10, wherein the energy saving unit is further configured to discard the received print job.

17. The system of claim 10, wherein the energy saving unit is further configured to:

create a new process, wherein the new process allows the energy saving unit to discard the received print job and receive a new print job concurrently.

18. The method of claim 10, wherein the main unit is further configured to receive the print job cancel command via a user interface.

19. A non-transitory computer-readable medium, having stored thereon program instructions that, upon execution by a processor cause performance of a set of acts comprising:

receiving, at an energy saving unit, a print job, wherein the print job includes a first portion;

transmitting the first portion of the print job to a main unit;

receiving, a print job cancel command corresponding to the received print job, wherein the command is received before the full print job has been received;

transmitting a notification of the received cancel command from the main unit to the energy saving unit;

receiving, at the energy saving unit, the notification of the received cancel command; and responsive to receiving the notification, terminating the transmission of the print job from the energy saving unit to the main unit.

20. The non-transitory computer-readable medium of claim 19, the set of acts further comprising:

responsive to receiving the notification, discarding the received print job.

* * * * *